March 11, 1958  C. R. BUSCH  2,826,279
BRAKE BEAM FOR RAILWAY CAR TRUCKS
Filed Feb. 18, 1955  5 Sheets-Sheet 1
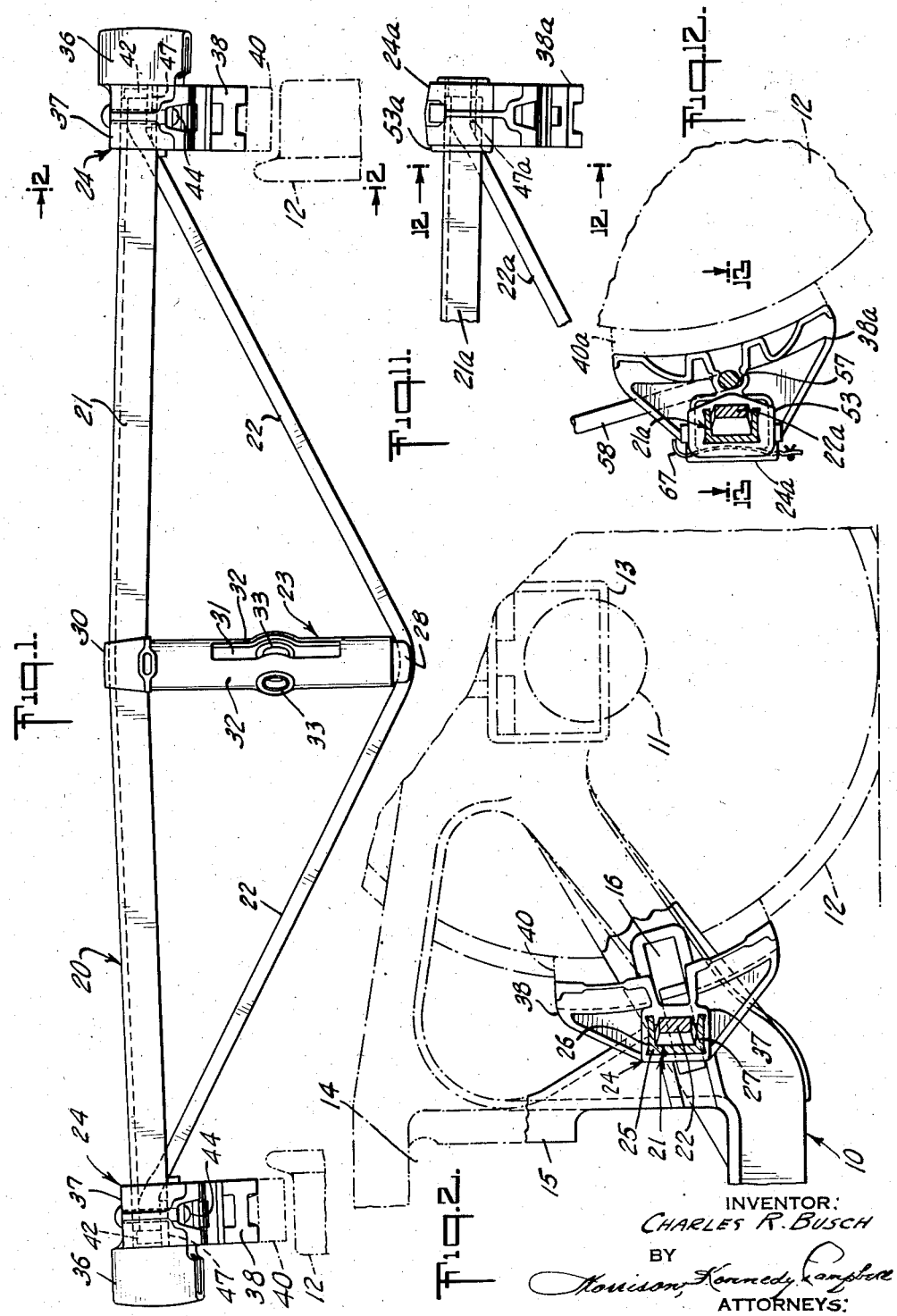
INVENTOR:
CHARLES R. BUSCH
BY
ATTORNEYS:

March 11, 1958     C. R. BUSCH     2,826,279
BRAKE BEAM FOR RAILWAY CAR TRUCKS
Filed Feb. 18, 1955     5 Sheets-Sheet 2
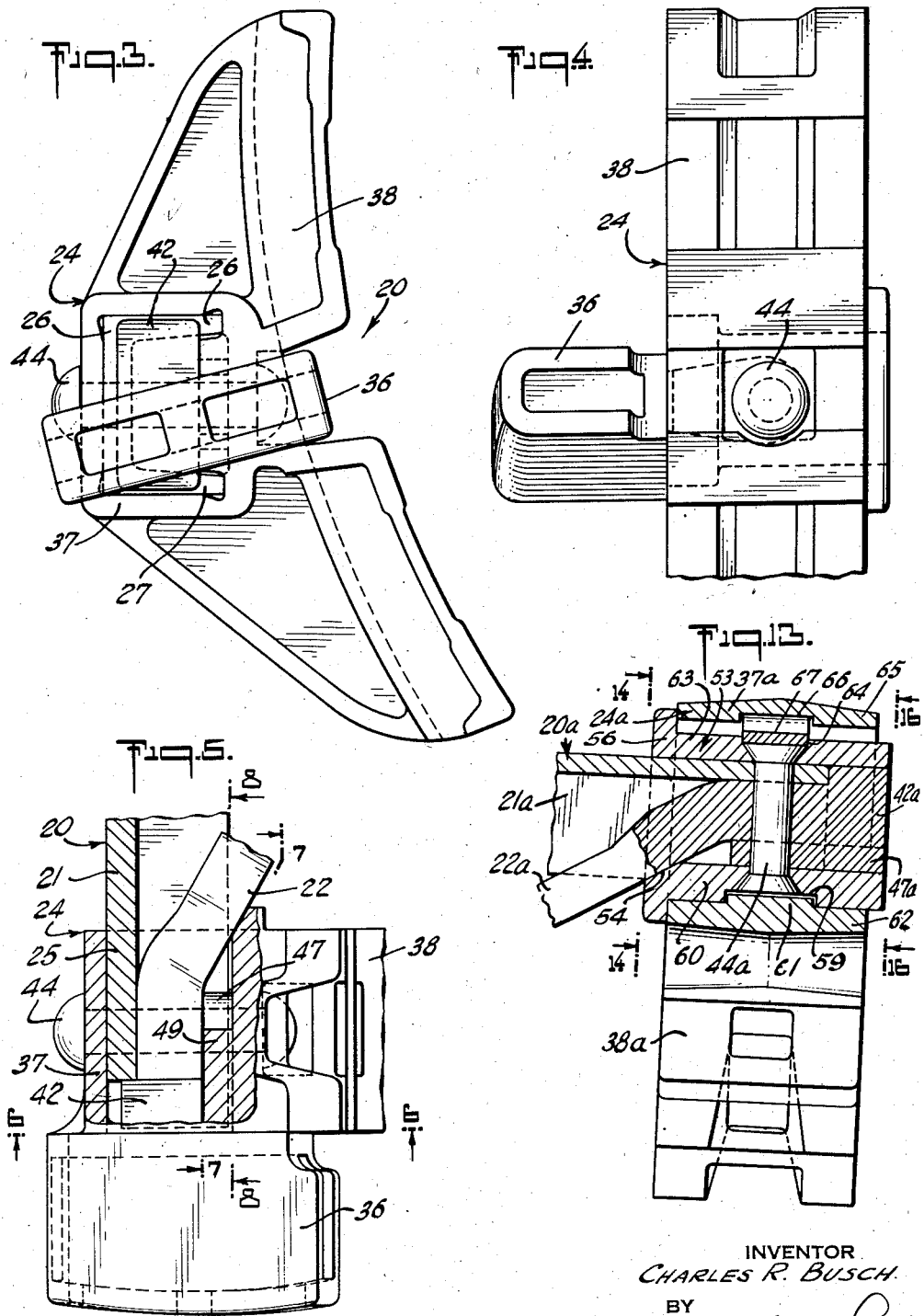
INVENTOR
CHARLES R. BUSCH
BY
Morrison, Kennedy Campbell
ATTORNEYS March 11, 1958  C. R. BUSCH  2,826,279
BRAKE BEAM FOR RAILWAY CAR TRUCKS
Filed Feb. 18, 1955  5 Sheets-Sheet 3
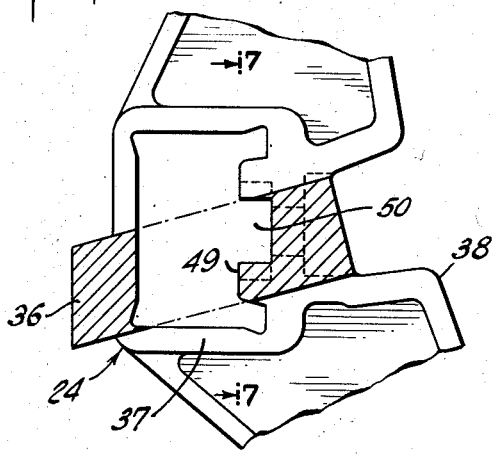
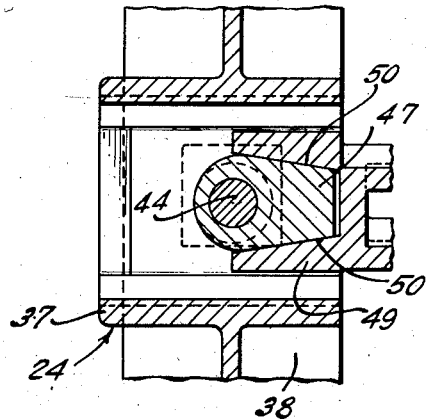
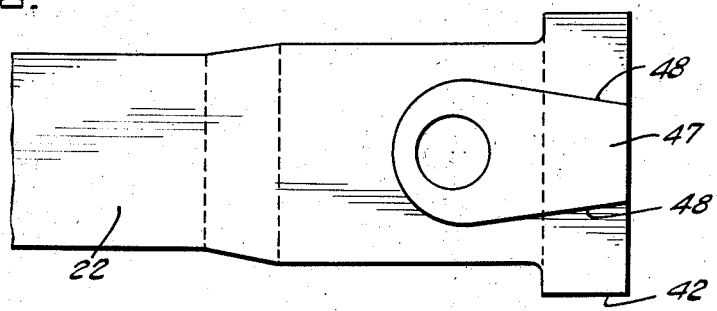
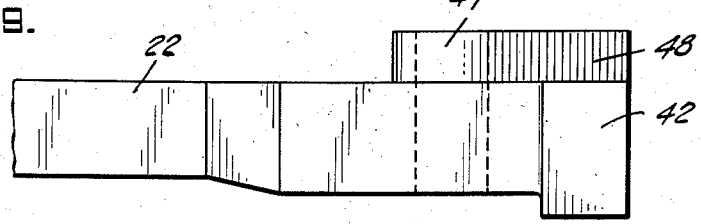
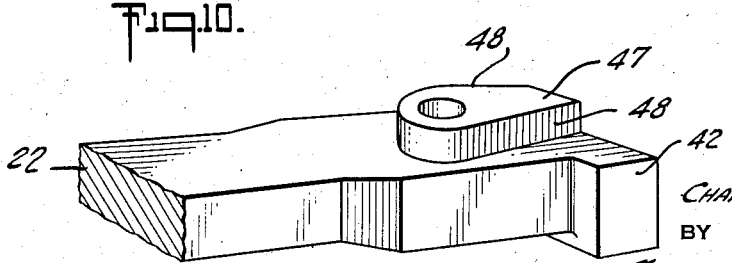
INVENTOR:
CHARLES R. BUSCH
BY
ATTORNEYS:

March 11, 1958 C. R. BUSCH 2,826,279
BRAKE BEAM FOR RAILWAY CAR TRUCKS
Filed Feb. 18, 1955 5 Sheets-Sheet 4
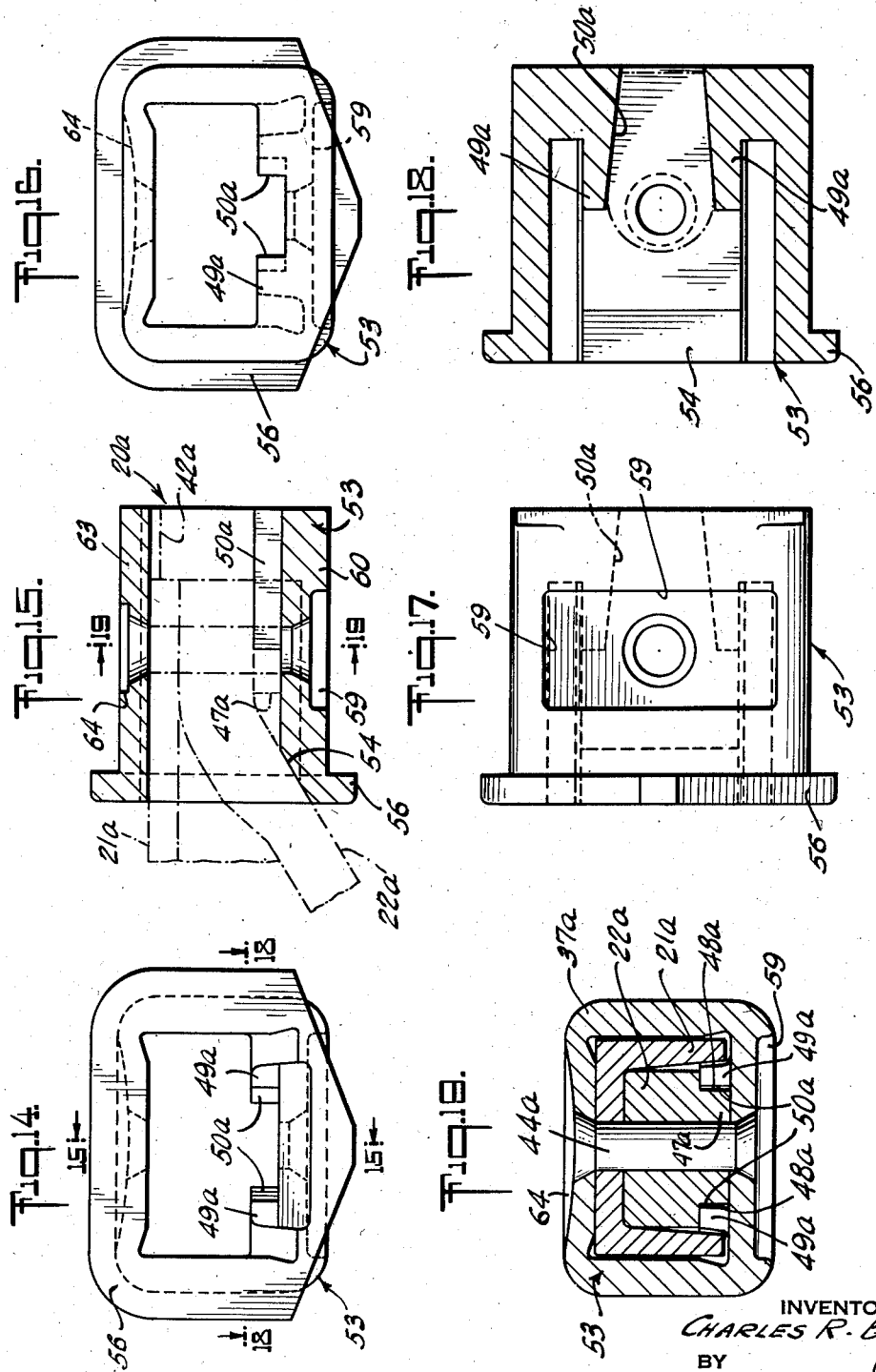
INVENTOR
CHARLES R. BUSCH
BY
Morrison, Kennedy, Campbell
ATTORNEYS March 11, 1958 C. R. BUSCH 2,826,279
BRAKE BEAM FOR RAILWAY CAR TRUCKS
Filed Feb. 18, 1955 5 Sheets-Sheet 5

INVENTOR:
CHARLES R. BUSCH.
BY
Morrison Kennedy Campbell
ATTORNEYS:

United States Patent Office 2,826,279
Patented Mar. 11, 1958

2,826,279

BRAKE BEAM FOR RAILWAY CAR TRUCKS

Charles R. Busch, Orange, N. J., assignor to Buffalo Brake Beam Company, a corporation of New York Application February 18, 1955, Serial No. 489,143

19 Claims. (Cl. 188—223.1)

The present invention relates to railway car trucks and more particularly to improvements in the brake beams thereof.

A railway car truck of conventional type comprises a pair of side frames supporting two of the wheel axles, a bolster extending crosswise between the side frames with its ends guided and spring-supported in the side frames, and a pair of brake beams, one for each pair of coaxial car wheels, extending between the side frames and supported therefrom for movement towards and away from the corresponding wheel axles. Each of these brake beams carries at its ends brake heads for brake shoes which are adapted to be applied to the corresponding car wheels upon movement of the brake beam towards the axis of the car wheels.

The conventional brake beam is of truss construction and comprises a compression member, which is straight except for camber, a tension member connected at its ends to the ends of the compression member and bent intermediate its ends to form a V, and a strut extending between the midsection of the compression member and the apex of the tension member to maintain stress on the tension member and to impart camber to the compression member. In one conventional form of brake beam construction of the so-called unit type, there is rigidly and permanently affixed to the tension member and to the compression member, at each end, a brake head by means of a rivet which passes not only through the brake head but also through the ends of the compression member and the tension member, thereby rigidly connecting all of these parts together into a rigid unit. The rivet has great strength and holding power in a direction lengthwise thereof, i. e. in a substantially horizontal direction in assembled operative position of the car truck, but is not as effective in holding the brake head against stresses transverse to said horizontal direction.

In another conventional form of brake beam construction of the removable brake head type, a truss lock in the form of a collar is employed to connect the end of the compression member with the end of the tension member by means of a rivet passing through said members and through said truss lock, and the brake head is removably secured to this truss lock by means of a key. In this case, the brake head, through the truss lock, is held in position on the end of the brake beam with great strength in a direction lengthwise of the rivet, but this rivet is not as efficient in holding the brake head against stresses transverse to said direction.

One object of the present invention is to provide a brake beam having simple but effective means which hold with great strength the brake head on the end of a brake beam against stresses not only in a substantially horizontal direction but in a transverse direction, and which can be applied to existing conventional brake beams without altering their basic constructions.

In carrying out certain features of the present invention in connection with brake beams of the rigid brake head type, in addition to the conventional rivet for rigidly securing the brake head to the tension member and to the compression member at each end, there is forged, welded or cast onto the end of the tension member a tapered extension serving as a wedge key; and forged, welded or cast on the brake head is a tapered recess or socket extension defining a keyway adapted to receive said wedge key with a conforming fit in assembled position of the brake beam parts. When the brake beam is assembled, the wedge key on the tension member is jammed tight with a press fit into the keyway of the brake head, thereby holding the brake head in position with extra strength. The key and keyway unit is arranged with the tapering sides of this unit flanking opposite sides of the rivet, thereby imparting the extra strength to the brake head in all directions transverse to the longitudinal axis of the rivet. The combination of the rivet and the key and keyway arrangement serves to effectively hold the brake head with great strength in all directions.

In carrying out the features of the present invention in connection with a removable brake head type of brake beam, the tension member, the compression member and the truss lock are permanently connected together by a rivet as in conventional constructions. In addition, the tension member has a tapering key extension welded, forged or cast thereon and the truss lock has a tapering keyway structure welded, forged or cast thereon and conforming in contour to the key extension, to receive said key extension with a press conforming fit in assembled position of the brake beam components. This key and keyway unit is located with the tapering sides of the unit flanking opposite sides of the rivet, thereby imparting extra strength to the truss lock and through said truss lock to the brake head keyed thereto, in a direction transverse to the longitudinal axis of the rivet and to the plane of the truss formed by the compression member and the tension member. The combination of the rivet and the key and keyway arrangement serves to hold effectively the brake head with great strength in all directions.

The present invention is not only adapted for use in connection with brake beams of the hanger type, in which the brake beams are suspended by means of swingable supports for movement towards and away from the wheels, but also to brake beams of the type in which guideways are provided in the side frames of the trucks, and the brake heads have extensions slidable through wear plates in said guideways to support the brake beam for movement towards and away from the wheels.

Various other objects, features and advantages of the invention are apparent from the following description and from the accompanying drawings, in which Fig. 1 is a top plan view of a side frame guideway supported brake beam of the rigid brake head type having incorporated therein the wedge key and keyway arrangement of the present invention;

Fig. 2 is a side elevation of a portion of a car truck with the brake beam of Fig. 1 shown in full lines and in section taken on lines 2—2 of Fig. 1, the rest of the car truck being shown in dotted lines;

Fig. 3 is an end view of the brake beam of Fig. 1, but on a larger scale, and shown with the brake head attached;

Fig. 4 is a front face view of the brake head end of the brake beam of Fig. 1, but shown on a larger scale;

Fig. 5 is a top plan view of the brake head end of the brake beam of Fig. 1, but shown on a larger scale, part of the brake head being shown broken away to reveal part of the internal structure of the brake beam at this end;

Fig. 6 is a section of the brake head of Fig. 1, taken along the lines 6—6 of Fig. 5;

Fig. 7 is a section of the brake head end of the brake beam of Fig. 1, taken approximately along the lines 7—7 of Figs. 5 and 6;

Fig. 8 is a side elevation of the end of the brake beam tension member of Fig. 1 with its wedge key extension, but shown on a larger scale, and as viewed along the lines 8—8 of Fig. 5;

Fig. 9 is a top plan view of the end of the brake beam tension member of Fig. 1 with its wedge key extension, but shown on a larger scale;

Fig. 10 is a perspective view of the end of the brake beam tension member of Fig. 1 with its wedge key extension, but shown on a larger scale;

Fig. 11 is a fragmentary top plan view of a brake beam of the hanger removable brake head type having incorporated therein the wedge key and keyway arrangement of the present invention;

Fig. 12 is a section of the brake beam of Fig. 1, taken along lines 12—12 of Fig. 11;

Fig. 13 is a section of the brake beam of Fig. 1, taken along the lines 13—13 of Fig. 12, but shown on a larger scale;

Fig. 14 is an end view of the truss lock of Fig. 11, as seen by observation in an inward direction, along the lines 14—14 of Fig. 13;

Fig. 15 is a section of the truss lock of Fig. 11, taken along the lines 15—15 of Fig. 14;

Fig. 16 is an end view of the truss lock of Fig. 11, as seen by observation in an outward direction, along the lines 16—16 of Fig. 13;

Fig. 17 is a side view of the truss lock of Fig. 11, but shown on a larger scale;

Fig. 18 is a section of the truss lock of Fig. 11, taken along the lines 18—18 of Fig. 14;

Fig. 19 is a section of the end of the brake beam of Fig. 11, taken approximately along the lines 19—19 of Fig. 15;

Figure 20:
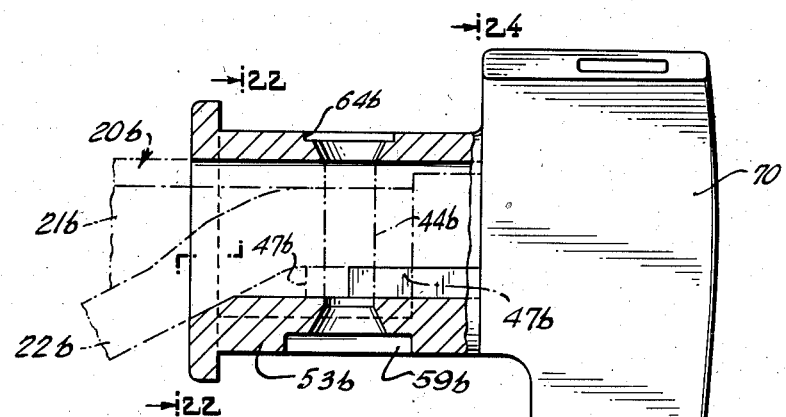
Fig. 20 is a top plan view of the brake head end of a brake beam of the removable brake head side frame guideway supported type having incorporated therein the wedge key and keyway arrangement embodying the present invention, part of the truss lock in this brake beam being shown broken away to reveal the internal structure of the brake beam at this end.

Referring to Figs. 1 to 10 of the drawings, and particularly to Figs. 1 and 2, there is shown the general assembly of a railway car truck comprising a pair of side frames 10 for supporting the axles 11 of car wheels 12 through journals 13. Each of these side frames 10 is in the form of a truss and has a center opening 14 which is adapted to receive one end of the usual bolster (not shown) connected to the bottom of the car (not shown) and which has side guideways 15 to constrain the bolster in its vertical movements. Springs (not shown) support the ends of the bolster in the frame openings 14 of the two side frames 10.

The side frames 10 for the brake beam of Figs. 1 to 10 are shown of the type provided with side guideways 16 lined with wear plates (not shown) for receiving and supporting end extensions on the brake heads, as is shown more fully in U. S. Patents Nos. 2,170,123 and 2,282,558.

Forming part of the car truck and extending between the side frames 10 are two brake beams 20, one for each pair of coaxial wheels 12. Each of these brake beams 20 includes a truss comprising generally a substantially straight compression member 21 along the rear of the truss, a tension member 22 along the front of the truss bent into a V and connected at its ends to the ends of the compression member in the manner to be described, and a strut 23 between the apex of the tension member and the mid-section of the compression member to maintain the tension in the tension member and camber in the compression member, and includes also brake heads 24 at the ends of the compression member. The compression member 21 is shown of channel form with a back web 25, a top flange 26 and a bottom flange 27 and the tension member 22 is shown in the form of a flat bar. The strut 23 (Fig. 1) is provided at one end with a pair of opposed flanges or ears 28 serving to define a channel to receive and seat therein the apex of the tension member 22 and at the other end with a yoke 30 to receive the compression member 21 and to impart camber to said compression member.

The intermediate section of the strut 23 has a slot 31 defining opposed walls 32 provided with bushings 33 to receive the pivot pin (not shown) of a live lever (not shown), constituting part of the brake beam operating mechanism. This brake beam operating mechanism may be of the type shown in U. S. Patents Nos. 2,170,112 and 2,518,120.

In Figs. 1 to 10, the brake beam 20 is of the type in which the brake head 24 constitutes part of the means by which the compression member 21 and the tension member 22 at each end are rigidly secured together and in which the brake head has an extension 36 adapted to fit slidably in the corresponding guideway 16 of the side frame 10, through wear plates (not shown), to support the brake beam 20 for operating movement towards and away from the corresponding car wheels 12. This brake head 24 has a collar 37 of generally rectangular form receiving the ends of the compression member 21 and the tension member 22 and a flange 38 on its front side to receive a brake shoe 40 by means of a key (not shown), for application to the car wheels 12, as shown in U. S. Patent No. 2,170,112. The collar 37 thereby serves as a mounting bracket for the brake head flange 38.

The end of the tension member 22 fits snugly into the hollow of the compression member 21 between its flanges 26 and 27 and has an enlargement or head 42 at one end for engagement with the end of the compression member to interlock the compression member and the tension member. A pin 44, shown in the form of a button head rivet, passes through the brake head collar 37, the back web 25 of the compression member 21 and the tension member 22 and rigidly secures these brake beam parts together. This rivet 44 is located centrally between the upper side and lower sides of the brake head collar 37, as shown in Fig. 3.

The construction so far described is conventional. In this construction, the rivet 44 extends in a direction frontwise and rearwise of the truss 21, 22, 23 and more specifically substantially horizontally in assembled condition of the car truck, as shown in Figs. 2 and 3, and substantially in the direction of movement of the brake beam along the side frame guideways 16 in its operation towards and away from the corresponding car wheels 12. Since this rivet 44 is tight in tension, it has great strength lengthwise thereof and therefore holds the part connected thereto effectively against stresses substantially in a horizontal direction and substantially in the plane of the truss formed by the structural members 21, 22 and 23. However, the rivet 44, partly because of its limited cross-sectional area and partly because it may not fully fill transversely the openings through which it passes, is not so effective in shear to hold the brake head 24 against stresses in directions transverse to the rivet 44 and to the general plane of the truss 21, 22, 23, especially in a substantially vertical direction. It is important to hold the brake head 24 with great strength in this transverse direction, especially during brake application, since the car wheels 12 impart great stresses to the brake heads in this direction during such brake application.

As a feature of the present invention, means are provided for imparting to the brake head structure at its ends great strength in directions transverse to the substantially horizontal direction of the rivet 44, so that the combination of this means and the rivet impart to the brake head structure, at its ends, great strength in all directions. For that purpose, the tension member 22, at each end, has an extension 47 on its front with straight converging opposite side surfaces 48 to form a tapered wedge key. These converging side surfaces 48 serving as pressure planes flank the opposite horizontally extending sides of the rivet 44 above and below it, are symmetrically arranged with respect thereto and face respective directions transverse to the plane of the truss 21, 22, 23. The wedge key 47 which extends lengthwise of the tension member 22, and which tapers outwardly towards the adjacent end of the tension member 22 of which it forms a part, may be cast, welded or forged onto the tension member.

To receive the wedge key 47 of the tension member 22, the front wall of the brake collar 37 on the inside thereof has a keyway structure 49, welded, forged or cast thereon and defining a keyway 50 with converging side walls to taper outwardly in conformity with the taper in the wedge key. In assembled position of the brake beam 20, the key 47 extends into the keyway 50 with coincidence and with a press fit, so that the side walls of the keyway abut the side surfaces 48 of the key face to face, whereby the key connection 47, 50 resists movement of the mounting bracket or collar 37 relative to the truss 21, 22, 23 in directions transverse to the truss plane. The head 42 at the end of the tension member 22 is so located with respect to the adjacent end of the compression member 21, as not to interfere with the press fit engagement of the wedge key 47 with the keyway 50.

The key and keyway structure 47, 49 described, with its press fit interlocking engagement, holds the brake head 24 firmly and rigidly with great strength against stresses in a direction transverse to the rivet 44 and especially in substantially vertical directions transverse to the planes of the converging side surfaces 48 of the key 47. Since the rivet 44 takes care of the stresses in a substantially horizontal direction, the overall compound effect of the single rivet and the key and keyway structure 47, 49 is to impart to the brake head 24 great strength substantially in all directions. It should be noted that the additions described to provide the key and keyway structure 47, 49 of the present invention can be made easily on existing brake beam structures by the simple expedient of welding, forging or casting it on the tension member 22 and the brake head collar 37. In the case of new structure embodying this feature, it should be noted that this does not require any change in the basic construction of the brake beam 20 or of the associated car truck parts.

Figs. 1 to 10 show the features of the present invention incorporated into brake beams of the rigid brake head guideway supported type. Figs. 11 to 19 show the features of the present invention incorporated into brake beams of the removable brake head-hanger type. In this form of construction, the brake beam 20a (Fig. 13) includes a truss comprising a compression member 21a along the rear of the truss, a tension member 22a along the front of the truss and a strut (not shown), the brake beam parts being designed and arranged in truss form, as in the construction of Figs. 1 to 10, except that the tension member 22a instead of being shown of rectangular cross-section throughout its length, as in Figs. 1 to 10, is round except at the ends, where it is of rectangular cross-section.

In the construction of Figs. 11 to 19, there is provided a truss lock 53 to secure rigidly the compression member 21a and the tension member 22a together and to serve as a removable mounting bracket for a brake head 24a. This truss lock 53 is in the form of a sleeve or collar, of generally rectangular shape, to receive one end of the compression member 21a with a snug fit and has internally a sloping seat 54 for the tension member 22a as it enters the truss lock. The end of the tension member 22a fits into the hollow of the compression member 21a with a snug fit and is provided at each end with a head 42a seated against the end of the compression member within the truss lock 53. A pin 44a, shown in the form of a countersunk rivet, passes through the truss lock 53, through the tension member 22a and through the compression member 21a, and rigidly secures these parts 21a, 22a and 53 together. This rivet 44a is located centrally between the upper and lower walls of the truss lock 53, as shown in Fig. 19.

The brake head 24a has on its rear side a collar 37a of generally rectangular form receiving the truss lock 53 and the ends of the compression member 21a and the tension member 22a, and the truss lock 53 has a flange 56 at its inner end against which the brake head collar 37a bears in assembled position of the parts. The brake head 24a also has a flange 38a on its front side to receive a brake shoe 40a (Fig. 12) by means of a key (not shown) for application to the car wheels 12, as shown in U. S. Patent No. 2,170,112. This brake head flange 38a has an opening 57 (Fig. 12) to receive a support 58, by which the brake beam 20a may be suspended from the side frames 10 of the car truck and supported for movement towards and away from the car wheels 12 substantially in a horizontal direction, in a manner shown in U. S. Patent No. 2,412,388.

To connect removably the brake head 24a to the truss lock 53, the truss lock has a recess 59 (Fig. 13) of rectangular cross-section on its front wall 60 across the region of the rivet 44a. Into this recess 59 extends a rib or ridge 61 of corresponding rectangular cross-section on the front wall 62 of the brake head collar 37a, in mounted position of the brake head 24a. The rear wall 63 of the truss lock 53 along the rivet 44a is provided with a recess 64 of rectangular cross-section and the rear wall 65 of the brake head collar 37a is provided with a recess 66 of rectangular cross-section facing said recess 64. In these recesses 64 and 66 is a bowed spring key 67 of flat bar stock, serving to lock the brake head 24a onto the truss lock 53 and at the same time to draw the brake head collar 37a in a direction, to cause the rib 61 on said collar to enter fully into the recess 59 on the truss lock 53.

The construction so far described is conventional and is covered in some of the aforesaid patents. In such a conventional construction, the rivet 44a holds the truss lock 53 rigidly with great strength in the direction lengthwise thereof frontwise and rearwise of the truss 21a, 22a, i. e. substantially horizontally. However, this rivet 44a, as in the case of the construction of Figs. 1 to 10, is somewhat deficient in holding the truss lock 53 in a direction transverse of the truss plane and especially in substantially vertical directions against the tangential stressing actions of the car wheels 12. For that purpose, the tension member 22a, at each end, has an extension 47a in the form of a tapered wedge key on its front with straight converging opposed side surfaces 48a flanking opposite sides of the rivet 44a above and below it, symmetrically arranged with respect thereto and facing respective directions transverse to the truss plane. This wedge key 47a tapers outwardly towards the adjacent end of the tension member 22a of which it forms a part, and may be cast, welded or forged onto the tension member.

To receive the wedge key 47a of the tension member 22a, the front of the truss lock 53 on its inside has a keyway structure 49a welded, forged or cast thereon and defining a keyway 50a tapering outwardly in conformity with the taper in the wedge key 47a. In assembled position of the brake beam, the key 47a extends into the keyway 50a with coincidence and with a press fit. The head 42a at the end of the tension member 22a is so located with respect to the adjacent end of the compression member 21a, as not to interfere with the press fit engagement of the wedge key 47a with the keyway 50a.

The key and keyway structure 47a, 49a with its press fit interlocking engagement, holds the brake head 24a firmly and rigidly with great strength against stresses in a direction transverse to the rivet 44a and especially in substantially vertical directions transverse to the planes of the converging side surfaces 48a of the key 47a and transverse to the plane of the truss formed by the compression member 21a and the tension member 22a. Since the brake head 24a is locked to truss lock 53, the holding of the truss lock firmly in position with great strength against stresses transverse to the rivet 44a, serves to hold the brake head 24a with great strength against such transverse stresses.

As in the case of the structure of Figs. 1 to 10, the key and keyway structure 47a, 49a in the construction of Figs. 11 to 19 can be made easily on existing brake beam structures by the simple expedient of welding, forging or casting said structure on the tension member 22a and the truss lock 53. In the case of new brake beam structures embodying this feature, no changes in the basic construction of the brake beam 28 or of the associated car truck parts are required.

Figure 21:
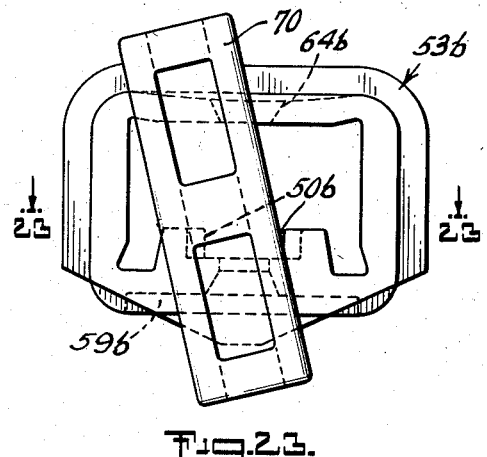
Fig. 21 is an end view of the truss lock of Fig. 20.
Figure 22:
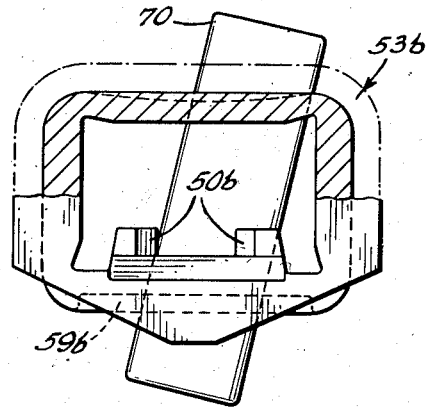
Fig. 22 is a section of the truss lock, taken along the lines 22—22 of Fig. 20.
Figure 23:
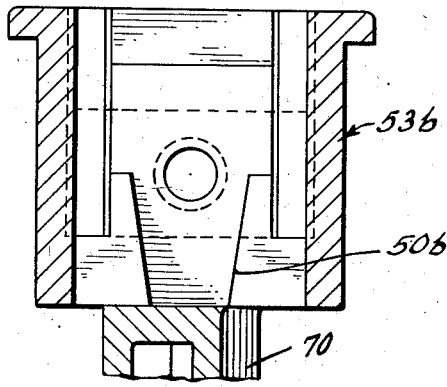
Fig. 23 is a section of the truss lock, taken along the lines 23—23 of Fig. 21.
Figure 24:
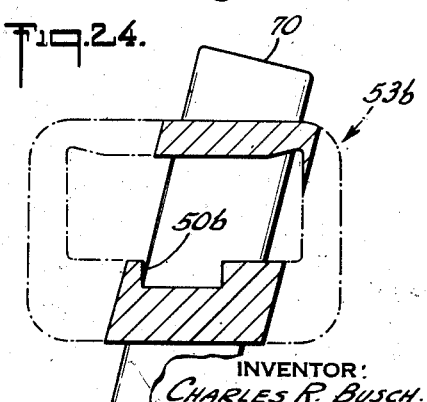
Fig. 24 is a section of the truss lock, taken along the lines 24—24 of Fig. 20.

The construction of Figs. 20 to 24 is similar to that of Figs. 11 to 19, except that instead of the brake beam being of the hanger supported, brake head removable type, it is of the side frame guided, brake head-removable type. In this modification, the brake beam 20b includes a truss comprising a compression member 21b along the rear of the truss and a tension member 22b along the front of the truss arranged through a strut (not shown) into truss form, as in the construction of Figs. 11 to 19. The truss lock 53b is similar to the truss lock 53 in the construction of Figs. 11 to 19, except that the truss lock 53b at one end has an extension 70 adapted to fit in the corresponding guideway 16 (Fig. 2) of the side frame 10 through wear plates (not shown) to support the brake beam 20b for movement substantially horizontally towards and away from the corresponding car wheels 12. Since the brake beam 20b is intended to be supported and guided for movement towards and away from the car wheels 12 through this side frame guide arrangement, no hanger suspension for the brake beam 20b is necessary.

The compression member 21b, the tension member 22b and the truss lock 53b are rigidly connected together as in conventional construction by a pin 44b, shown in the form of a countersunk rivet.

The brake head, which is not shown in the construction of Figs. 20 to 24, is similar to that in the construction of Figs. 11 to 19 and is similarly secured to the truss lock 53b by a ridge on one side of the brake head car fitting into the recess 59b in the truss lock and by a spring key fitting into the recess 64a and the recess in the brake head collar.

To provide for stresses on the brake head transverse to the rivet 44b and especially in a substantially vertical direction, the tension member 22b is integrally provided with a tapering wedge key 47b extending into a corresponding tapering keyway 50b in the truss lock 53b with a conforming press fit.

The key and keyway structures 47b, 50b of Figs. 20 to 24 may be forged, cast or welded onto the tension member 22b and onto the truss lock 53b as in the construction of Figs. 11 to 19 and are similarly designed and arranged to impart great structural strength to the truss lock 53b in a direction transverse to the longitudinal direction of the rivet 44b and especially in a vertical direction and from said truss lock to the brake head 24b.

In all of the forms of the invention described, the substantially horizontal rivet passes centrally through the key and keyway structure, so that the converging side walls of the keyway on the brake head (Figs. 1 to 10) or truss lock (Figs. 11 to 24) are located above and below the rivet and symmetrically with respect thereto and these sides serve as shoulders for the corresponding converging side surfaces of the wedge extension on the tension member. These shoulders so arranged, effectively resist stresses on said brake head or truss lock in directions transverse to the longitudinal direction of the rivet and to the plane of the truss and especially in substantially vertical directions.

Although in all of the forms described, the wedge extension is on the tension member and the keyway therefor is on the brake head collar or on the truss lock, as far as certain aspects of the invention are concerned, this arrangement can be reversed, so that the wedge extension is on the brake head collar or on the truss lock and the keyway is on the tension member.

While the invention has been described with particular reference to specific embodiments, it is to be understood that it is not to be limited thereto, but is to be construed broadly and restricted solely by the scope of the appended claims.

What is claimed is:

1. A railway brake beam for two coaxial wheels of a railway car comprising a truss having a substantially straight compression member along the rear side of the truss, a tension member in the form of a V along the front side of the truss, said members being rigidly secured together at each end, and strut means between the tension member and the compression member, said compression member, tension member and strut means lying substantially and generally in a common plane, a brake head flange near each end of the truss for a brake shoe, a mounting bracket for each brake head flange, means rigidly connecting each mounting bracket to the truss near each end thereof mainly against movement relative to the truss in a general direction frontwise and rearwise of the truss, and a snug key connection between each bracket and one of said truss members near the corresponding end of the truss, said key connection comprising a key defining opposite side surfaces facing respective directions transverse to said truss plane and a keyway for receiving said key defining corresponding side walls abutting said side surfaces respectively face to face, whereby said key connection resists movement of the corresponding bracket relative to the truss in directions transverse to said truss plane.

2. A railway brake beam as described in claim 1, wherein the mounting bracket for the brake head flange comprises a collar embracing the compression member and the tension member near each end of the truss.

3. A railway brake beam as described in claim 1, wherein the means rigidly connecting the mounting bracket to one of said members at each end of the truss is in the form of a fastening element acting in tension along said frontwise and rearwise direction.

4. A railway brake beam as described in claim 1, wherein said key tapers towards one end to cause said opposite side surfaces of the key to converge towards the latter end of the key, and said keyway is of corresponding tapering configuration to receive said key therein with a snug conforming wedge fit.

5. A railway brake beam as described in claim 1, wherein said beam when supported for operation is adapted to move substantially horizontally into and out of wheel braking positions, and wherein when said beam is so supported, said frontwise and rearwise direction is substantially horizontal and said transverse direction is substantially vertical.

6. A railway brake beam as described in claim 1, wherein the means for rigidly connecting said mounting brackets to one of said truss members near each end of the truss is in the form of a pin extending through the corresponding key along said frontwise and rearwise direction and located between the opposite side surfaces of the key, said pin acting in tension to resist movements of the bracket in the latter direction relative to the truss.

7. A railway brake beam as described in claim 1, wherein said key is integral with the tension member and said keyway is on the corresponding mounting bracket.

8. A railway brake beam as described in claim 1, wherein the mounting bracket is in the form of a collar embracing said truss members near each end of the truss, and means rigidly connecting the mounting bracket to one of said truss members near each end of the truss is a rivet passing through said truss members and said collar and extending in said frontwise and rearwise direction, the key is integral with the tension member and tapers towards one end to cause said opposite side surfaces of the key to converge towards the latter end of the key, the keyway is on the collar and has a configuration corresponding to that of said key to receive said key with a conforming wedge fit, the brake beam is adapted when supported for operation to move substantially horizontally in said truss plane towards and away from the car wheels, said opposite side walls of the keyway are located one above the other when the brake beam is so supported, and the rivet extends substantially horizontally when the brake beam is supported for operation and passes through the key connection substantially centrally thereof between said opposite side walls of the keyway.

9. A railway brake beam as described in claim 8, wherein the opposite side surfaces of the key converge towards the end of the truss nearest thereto and outwardly away from the center thereof, to permit the collar to be slipped onto the corresponding key on the tension member by a movement of the collar from the outside of the truss at one end thereof inwardly along the tension member.

10. A railway brake beam as described in claim 1, wherein the mounting bracket is integral with the brake head flange to form therewith part of the brake head and the means for rigidly connecting the mounting bracket to one of said members is a tension pin passing through the mounting bracket, the tension truss member and the compression member, and extending in said frontwise and rearwise direction.

11. A railway brake beam as described in claim 1, wherein the mounting bracket is a collar integral with the brake head flange to form therewith part of the brake head and embracing the tension member and compression member at each end, the key connection is between the tension member and the collar, the key tapers towards one end to cause the opposite side surfaces of the key to converge towards the latter end, and the keyway has a corresponding configuration to receive the key with a snug conforming wedge fit.

12. A railway brake beam as described in claim 1, wherein the brake beam is of the type adapted to be supported between side frames constituting part of a railway car truck and having respective guideways extending substantially horizontal, and each mounting bracket has rigid therewith an end extension adapted to project into the corresponding guideway for sliding movement therein.

13. A railway brake beam as described in claim 1, wherein the mounting bracket is a collar integral with the brake head flange and embracing the tension member and compression member near one end, the brake beam is of the type adapted to be supported between side frames constituting part of a railway car truck and having respective guideways extending substantially horizontally, and each collar has rigid therewith an end extension adapted to project into the corresponding guideway for sliding movement therein.

14. A railway brake beam as described in claim 1, wherein the mounting bracket is a truss lock in the form of a collar separate from the brake head flange, and wherein the brake head flange is connected to said truss lock by removable means.

15. A railway brake beam as described in claim 1, wherein the mounting bracket is a truss lock in the form of a collar separate from the brake head flange, the brake head flange is connected to the truss lock by removable means, the truss lock embraces the tension member and the compression member near each end of the truss, and the means for rigidly connecting the mounting bracket to one of said truss members near one end of the truss against movement in said frontwise and rearwise direction is a tension pin extending in the latter direction through said truss lock and said truss members.

16. A railway brake beam as described in claim 1, wherein the mounting bracket is a truss lock in the form of a collar separate from the brake head flange, the brake head flange is connected to said truss lock by removable means, the truss lock embraces the tension member and the compression member near the corresponding end of the truss, the means rigidly connecting the mounting bracket to one of said members near the corresponding end of the truss is a rivet passing through said truss members and said truss lock and extending in said frontwise and rearwise direction, the key is integral with the tension member, extends along the corresponding end section of the tension member and tapers towards one end to cause the opposite side surfaces of the key to converge towards the latter end, the keyway is on the truss lock and has a configuration corresponding to that of said key to receive said key with a snug conforming wedge fit, the brake beam is adapted when supported for operation to move substantially horizontally towards and away from the railway car wheels, said opposite side surfaces of the key are located one above the other when the brake beam is so supported, and the rivet extends substantially horizontally when the brake beam is supported for operation and passes through the key connection substantially centrally between said opposite side surfaces.

17. A railway brake beam as described in claim 16, wherein the opposite side surfaces of the key converge towards the end of the truss nearest thereto, to permit the truss lock to be slipped onto the corresponding keyway on the tension member by a movement of the truss lock from the outside of the truss at one end thereof inwardly along the tension member.

18. A railway brake beam as described in claim 1, wherein the mounting bracket is a truss lock in the form of a collar separate from the brake head flange and embracing the tension member and the compression member at each end, the brake head flange is connected to the truss lock by removable means, the brake beam is of the type adapted to be supported between side frames constituting part of a railway car truck and having respective guideways extending substantially horizontally, and each of said truss locks has rigid therewith an end extension adapted to project into a corresponding guideway for slide movement therein.

19. A railway brake beam as described in claim 1, wherein each of said brake head flanges has means for pivotally receiving a hanger by which the brake beam may be suspended by said hangers from side frames located at opposite ends of the brake beam and constituting part of a railway car truck.

References Cited in the file of this patent

UNITED STATES PATENTS

| Number | Name | Date |
| --- | --- | --- |
| 164,891 | Wieterhold et al. | June 22, 1875 |
| 486,218 | Robischung | Nov. 15, 1892 |
| 813,916 | Robischung | Feb. 27, 1906 |
| 884,445 | Williams | Apr. 14, 1908 |
| 956,616 | Williams | May 3, 1910 |
| 1,593,765 | Huntoon | July 27, 1926 |
| 2,493,239 | Ekholm | Jan. 3, 1950 |
| 2,570,202 | Busch | Oct. 9, 1951 |